(12) United States Patent
Yun (10) Patent No.: US 10,100,971 B2
(45) Date of Patent: Oct. 16, 2018

(54) DEVICE FOR SUPPORTING PORTABLE TERMINAL

(71) Applicant: Yang-Jun Yun, Incheon (KR)

(72) Inventor: Yang-Jun Yun, Incheon (KR)

(73) Assignee: Yang-Jun Yun, Incheon (KR)

( * ) Notice: Subject to any disclaimer, the term of this patent is extended or adjusted under 35 U.S.C. 154(b) by 30 days.

(21) Appl. No.: 15/255,480

(22) Filed: Sep. 2, 2016

(65) Prior Publication Data

US 2017/0067595 A1    Mar. 9, 2017

(30) Foreign Application Priority Data

Sep. 3, 2015 (KR) ........................ 10-2015-0124776

(51) Int. Cl.
| | | |
|---|---|---|
| *B60R 11/02* | (2006.01) | |
| *F16M 13/02* | (2006.01) | |
| *F16B 1/00* | (2006.01) | |
| *F16M 11/04* | (2006.01) | |
| *F16M 11/10* | (2006.01) | |

(Continued)

(52) U.S. Cl.
CPC ............. *F16M 13/02* (2013.01); *B60R 11/02* (2013.01); *B60R 11/0241* (2013.01); *B60R 11/0252* (2013.01); *F16B 1/00* (2013.01); *F16M 11/041* (2013.01); *F16M 11/10* (2013.01); *F16M 11/2014* (2013.01); *F16M 13/00* (2013.01); *G09F 21/04* (2013.01); *G09F 23/00* (2013.01); *H04M 1/04* (2013.01); *B60R 2011/0071* (2013.01); *B60R 2011/0087* (2013.01);

(Continued)

(58) Field of Classification Search
CPC . B60R 11/02; B60R 11/0241; B60R 11/0252; B60R 2011/0017; B60R 2011/0087; F16B 1/00; F16B 2001/0035; F16M 11/041; F16M 11/10; F16M 11/2014; F16M 13/00; F16M 2200/024; G09F 21/04; G09F 23/00; H04M 1/04
USPC .......... 248/278.1, 279.1, 206.5, 282.1, 276.1
See application file for complete search history.

(56) References Cited

U.S. PATENT DOCUMENTS

| | | | | |
|---|---|---|---|---|
| 7,007,906 B2* | 3/2006 | Slatter | ..................... | A01K 91/08 |
| | | | | 114/255 |
| 9,019,698 B2* | 4/2015 | Thiers | .................... | H04W 88/02 |
| | | | | 248/922 |

(Continued)

FOREIGN PATENT DOCUMENTS

KR          20-0470827 Y1      1/2004

*Primary Examiner* — Nkeisha Smith
(74) *Attorney, Agent, or Firm* — The PL Law Group, PLLC (57) ABSTRACT

A device for supporting a portable terminal includes a base member fixed to an installing surface, a horizontal rotation member coupled to the base member such that the horizontal rotation member is rotatable in a horizontal direction with respect to the installing surface, wherein a vertical support protrudes from a top surface of the horizontal rotation member, a vertical rotation member coupled to the vertical support such that the vertical rotation member is rotatable in a vertical direction with respect to the installing surface, and a support member formed on one end of the vertical rotation member, wherein the portable terminal is detachably attached to the support member. According to the device, the supporting angel of the portable terminal may be freely controlled and the supporting state may be stably maintained at the controlled angle, so that the convenience in use is improved.

7 Claims, 9 Drawing Sheets

(51) Int. Cl.
*F16M 11/20* (2006.01)
*F16M 13/00* (2006.01)
*G09F 21/04* (2006.01)
*G09F 23/00* (2006.01)
*H04M 1/04* (2006.01)
*B60R 11/00* (2006.01)

(52) U.S. Cl.
CPC ............... *F16B 2001/0035* (2013.01); *F16M 2200/024* (2013.01)

(56) References Cited

U.S. PATENT DOCUMENTS

| | | | |
|---|---|---|---|
| 9,388,934 B1* | 7/2016 | Kilgore | H04N 5/2251 |
| 9,631,767 B2* | 4/2017 | Kilgore | F16M 11/2064 |
| 2007/0262216 A1* | 11/2007 | Wang | B60R 11/02 |
| | | | 248/205.3 |
| 2014/0358275 A1* | 12/2014 | Browne | A45C 13/1069 |
| | | | 700/214 |
| 2015/0369418 A1* | 12/2015 | Wong | F16M 11/041 |
| | | | 248/372.1 |
| 2016/0040825 A1* | 2/2016 | Franklin | F16M 13/02 |
| | | | 439/39 |
| 2016/0069510 A1* | 3/2016 | Chen | F16M 13/022 |
| | | | 248/206.5 |

* cited by examiner

DEVICE FOR SUPPORTING PORTABLE TERMINAL

CROSS-REFERENCE TO RELATED APPLICATION

This application claims priority to and the benefit of Korean Patent Application No. 10-2015-0124776, filed on Sep. 3, 2015, the disclosures of which are incorporated herein by reference in its entirety

BACKGROUND

The present invention relates to a device for supporting a portable terminal, which is capable of stably supporting a portable terminal at various angles in various directions.

Most vehicle steering wheels includes a steering wheel body firmly connected to a steering column, and at least one movable member able to be pressed down with respect to the steering wheel body against force of a restoring member. The movable member is pressed down by the movable member, so that the steering wheel makes contact with a horn contact part. The use of a portable terminal such as a smartphone or a tablet PC has been rapidly increased. In addition, the portable terminal has been implemented as a multimedia device having complex functions of receiving broadcasting and reproducing a video as well as voice communication.

Such a portable terminal may be used while being carried and supported on a dashboard in a vehicle or a desk of an office or home. Thus, various types of portable terminal supporting devices have been produced.

However, a device for supporting a portable terminal according to the related art fixes the portable terminal at a predetermined angle in a predetermined direction, so that the use is limited. In addition, the coupling and separating structure of the portable terminal is complicate and troublesome so that it is inconvenient to use the device.

Meanwhile, a magnet support for a portable terminal, to which the portable terminal is detachably attached by magnetic force, has been disclosed in Korean Registered Utility Model No. 20-0470827 where a magnet is attached to the surface of an iron ball. However, when the portable terminal is supported for a long time, the supporting angle may be changed due to the weight of the portable terminal. Specifically, when the support is attached to a vehicle, the supporting angle may be arbitrarily changed due to the vibration and rotation of the vehicle, thereby causing inconvenience, so it is difficult to stably maintain the supporting state.

SUMMARY

To solve the problems, an aspect of the present invention is to provide a device for supporting a portable terminal, which is capable of freely controlling a supporting angel of the portable terminal, stably maintaining the supporting state at the controlled angle, and easily and detachably attaching the portable terminal thereto, so that the convenience in use is greatly improved.

To achieve the aspects, according to the present invention, there is provided a device for supporting a portable terminal, which includes:

a base member fixed to an installing surface; a horizontal rotation member coupled to the base member such that the horizontal rotation member is rotatable in a horizontal direction with respect to the installing surface, wherein a vertical support protrudes from a top surface of the horizontal rotation member; a vertical rotation member coupled to the vertical support such that the vertical rotation member is rotatable in a vertical direction with respect to the installing surface; and a support member formed on one end of the vertical rotation member, wherein the portable terminal is detachably attached to the support member.

According to the device for supporting a portable terminal of the present invention, since the portable terminal is detachably attached through magnetic force, the portable terminal may be conveniently coupled to or separated from the device, and the supporting angle and direction of the portable terminal may be variously controlled.

Specifically, even though external force such as vibration or rotational force is applied to the portable terminal supported at various angles in various directions, the supporting angel may not be arbitrarily changed and the supported state may be stably maintained, so that the convenience in use is improved.

In addition, the device may be utilized for displaying contact information as well as supporting a portable terminal, since it is convenient to use the device and there is no need to install a separated contact information display device, the vehicle is prevented from being messy. In addition, since it is possible to selectively display denoted contact information, individual information is prevented from being leaked.

DETAILED DESCRIPTION

Hereinafter, a device for supporting a portable terminal according to a preferable embodiment of the present invention will be described in detail with reference to accompanying drawings.

FIGS. 1 to 5 are views illustrating a device for supporting a portable terminal according to the present invention. A device 1 for supporting a portable terminal according to the present invention may include a base member 10, a horizontal rotation member 20, a vertical support 30, a vertical rotation member 40 and a support member 50.

Figure 1:
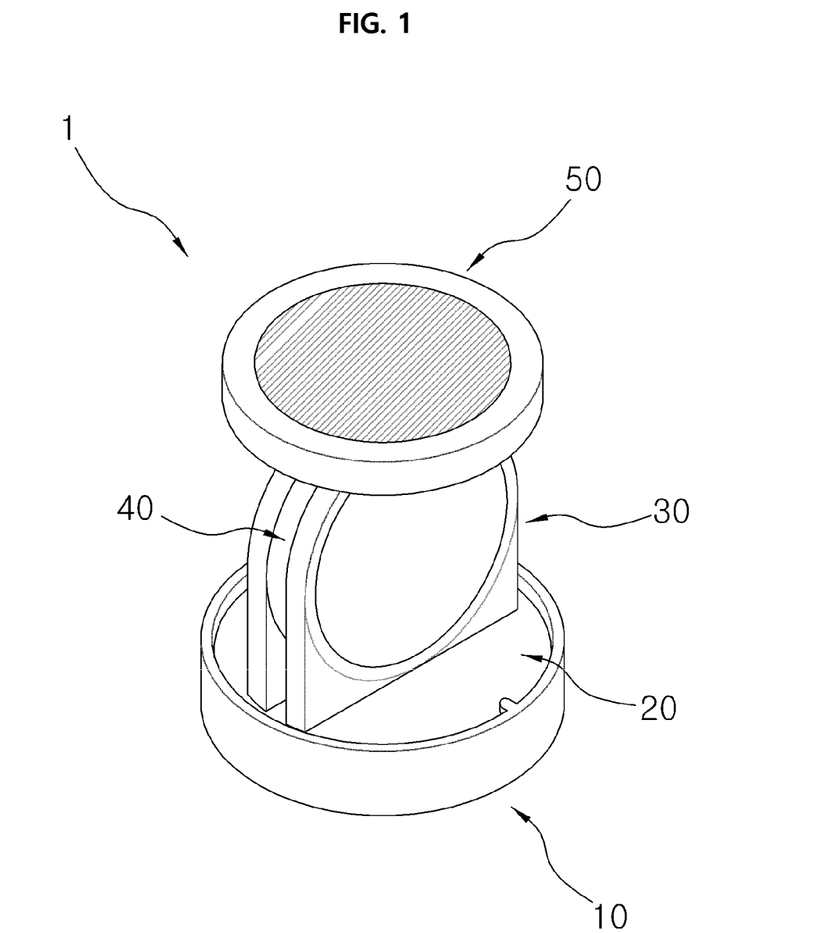
FIG. 1 is a perspective view illustrating a device for supporting a portable terminal according to the present invention.
Figure 2:
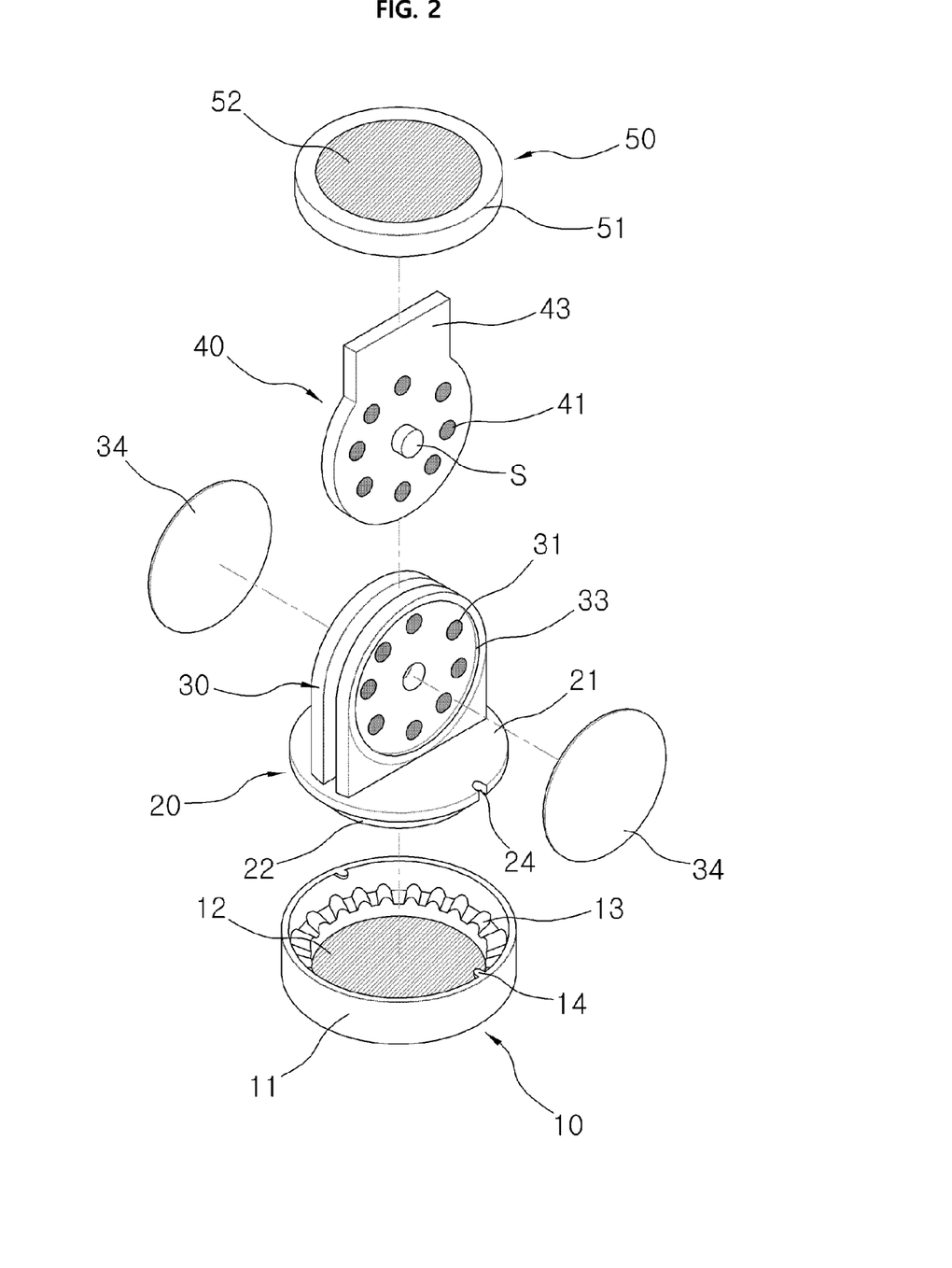
FIG. 2 is an exploded view of the device of FIG. 1.

The base member 10, which is attached to an installing surface of an object, such as a dashboard of a vehicle, a desk, a table, etc., on which the supporting device 1 of the present invention is to be mounted, includes a base body 11 and a base plate 12.

The base body 11 may have an opened top surface so that the inside thereof is formed in a hollow cylindrical shape. A bottom surface of the base body 11 may be provided with an adhesive such as a double-sided tape.

The base plate 12 is fixed onto an inner bottom of the base body 11 and is made of a metallic material such that the base plate 12 is enabled to be detachably attached to a magnetic substance 22 of the horizontal rotation member 20 which will be described below.

The horizontal rotation member 20, which is coupled to the base member 10 such that the horizontal rotation member 20 is rotatable in a horizontal direction with respect to the installing surface and separable from the base member 10, includes a rotational body 21 and a magnetic substance 22.

The rotational body 21 has a circular shape and is inserted into the base body 11. The magnetic substance 22 protrudes downwardly from a bottom surface of the rotational body 21 and is detachably attached to the base plate 12.

When the rotational body 21 is inserted into the base body 11, the magnetic substance 22 is attached to the base plate due to the magnetic force, so that the horizontal rotation member 20 is coupled to base member 10 rotatably in the horizontal direction.

In addition, to prevent the horizontal rotation member from being arbitrarily rotated about the base member 10, concave-convex parts 13 and 23 may be formed on the base member 10 and the horizontal rotation member 20 to additionally provide predetermined rotation restriction force. The concave-convex parts 13 and 23 may be formed on an inner circumference surface of the base body 11 and a lower circumference surface of the rotational body 21, which face each other, such that the concave-convex parts 13 and 23 are engaged with each other.

Since the concave-convex parts 13 and 23 are engaged with each other, as well as the magnetic force, the predetermined rotation restriction force is additionally applied to the horizontal rotation member 20, so that the horizontal rotation member 20 is prevented from being arbitrarily rotated in the horizontal direction.

Figure 5:
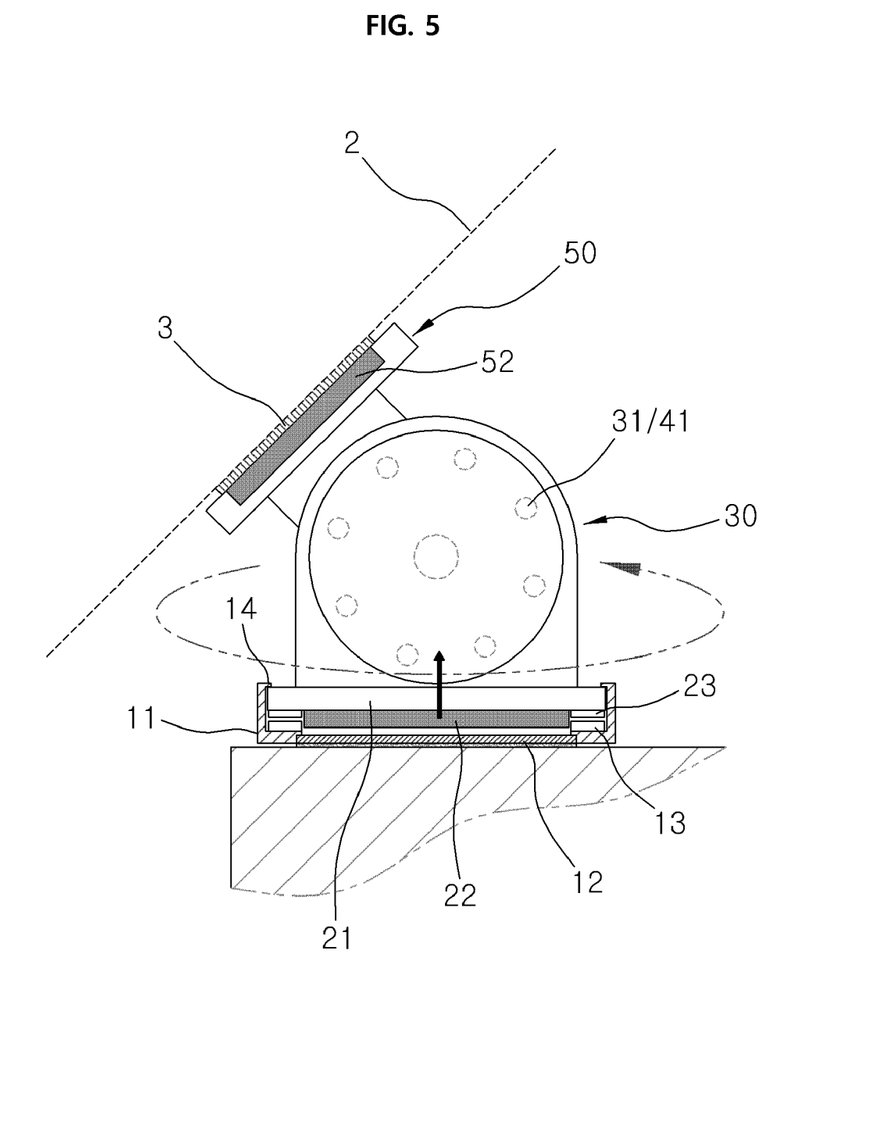

When it is desired to rotate the horizontal rotation member 20, as shown in FIG. 5, after the horizontal rotation member 20 is slightly lifted up to separate the engaged concave-convex parts 13 and 23 from each other (in this case, the magnetic substance 22 is separated from the base plate 12), the horizontal rotation member 20 is rotated by a desired angle and then, the magnetic substance 22 is allowed to be attached to the base plate 12 again, such that the concave-convex parts 13 and 23 are engaged with each other.

In addition, an upper end of the base body 11 may protrude upward over the rotational body, which is inserted into the base body 11, by a predetermined height (that is, a height sufficient to separate the engagement of the concave-convex parts 13 and 23 from each other) and a pair of latching protrusions may be formed at both sides on the upper end of the base body 11. A pair of protrusion grooves 24, through which the pair of latching protrusions 14 pass, may be formed at both side of a lateral surface of the rotational body 21.

Thus, when the latching protrusions 14 are aligned with the protrusion grooves 24 to allow the latching protrusions 14 to pass through the protrusion grooves 24, the interference is prevented such that the rotational body 21 is easily inserted into or separated from the base body 11. In addition, when the horizontal rotation member 20 is lifted up for the purpose of the horizontal rotation, the rotational body 21 is latched to the latching protrusions 14, such that the horizontal rotation member is lifted up in such a degree that the engagement of the concave-convex parts 13 and 23 is released without undesired separation of the horizontal rotation member 20 and the base member 10, thereby conveniently using the device.

The vertical support 30, which is a part for supporting the rotation of the vertical rotation member 40 to be described below, protrudes upwardly from a top surface of the horizontal rotation member 20.

The vertical support 30 may include a pair of left and right vertical supports which are spaced apart from each other by a predetermined interval such that the vertical rotation member 40 to be described below is inserted therebetween.

The vertical rotation member 40 has a circular shape and is coupled to the vertical support 30. The vertical rotation member 40 is inserted between the pair of vertical supports 30 to be shaft S coupled to the vertical supports 30, so that the vertical rotation member 40 is vertically rotatable with respect to the installing surface.

A connecting plate 43 connected to the support member 50 which will be described below protrudes from one side of the vertical rotation member 40.

Figure 3:
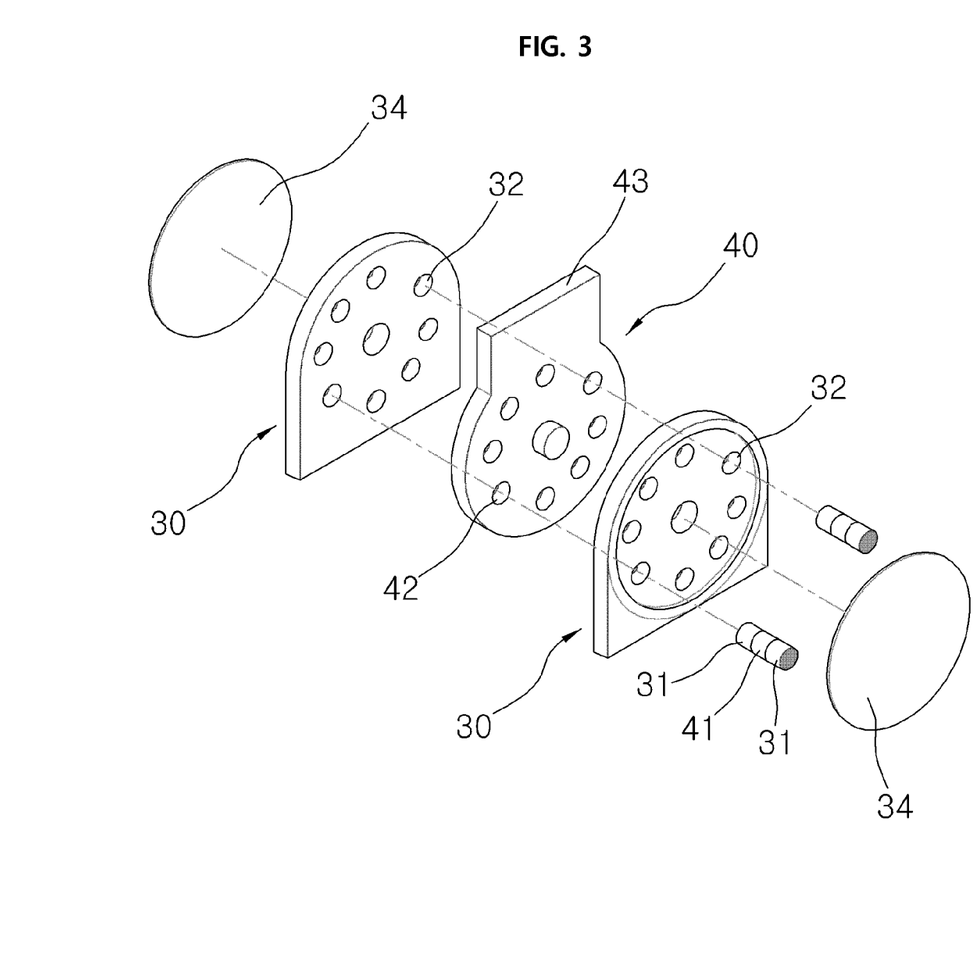
FIG. 3 is an exploded view illustrating a coupling relation between vertical and horizontal supports.

A vertical rotation control unit may be provided to the vertical support 30 and the vertical rotation member 40 shaft S coupled, such that the vertical rotation member 40 is prevented from being arbitrarily rotated.

The vertical rotation control unit may selectively fix the rotation state of the vertical rotation member 40 at various rotational angles, and may include a plurality of stopper magnets 31 and 41 according to one preferable embodiment.

The stopper magnets 31 and 41 are installed to the pair of vertical supports 30 and the vertical rotation member 40 while being spaced part from each other by a predetermined angular interval on a concentric circle which is centered on the shaft S. In this case, although eight stopper magnets which are installed spaced apart from each other by 45 degrees are depicted in the drawings, they are proposed only as one example and the number and installing angle of them may be variously embodied.

Thus, the stopper magnets 31 and 41 interact with each other every rotation angle at which the stopper magnets 31 and 41 are installed, so that the rotation state is maintained due to the predetermined fixing force, thereby maintaining the stable supporting state of a portable terminal at various angles while preventing the vertical rotation member 40 from be arbitrarily rotated.

Meanwhile, to easily install the stopper magnets 31 and 41, magnet installing holes 32 and 42 may be formed on the pair of vertical supports 30 and the vertical rotation member 40. In addition, each of the pair of vertical supports 30 may be provided on an outer side surface thereof with a circular-shaped groove 33 centered on the shaft S, and the circular-shaped grooves 33 may be fitted with metallic finishing plates 34.

In this case, when the stopper magnets 31 and 41 are installed, as shown in FIG. 3, in the state that the magnet installing holes 32 and 42 of the vertical supports 30 and the vertical rotation member 40 are aligned with each other, three stopper magnets 31 and 41, which are attached in series to each other, may be inserted into the aligned magnet installing holes 32 and 42 at the same time. In the state that the stopper magnets 31 and 41 are inserted into all the magnet installing holes 32 and 42 in the same manner as that described above, when the finishing plates 34 are fitted into the circular shaped grooves 33 of both sides, the finishing plates 34 are fixedly attached to the stopper magnets 34 inserted into the pair of vertical supports 30, so that it is more easy to install the stopper magnets 31 and 41.

The support member 50, to which the portable terminal 2 is detachably attached, is provided to one end of the vertical rotation member 40, that is, the connecting plate 43.

Figure 4:
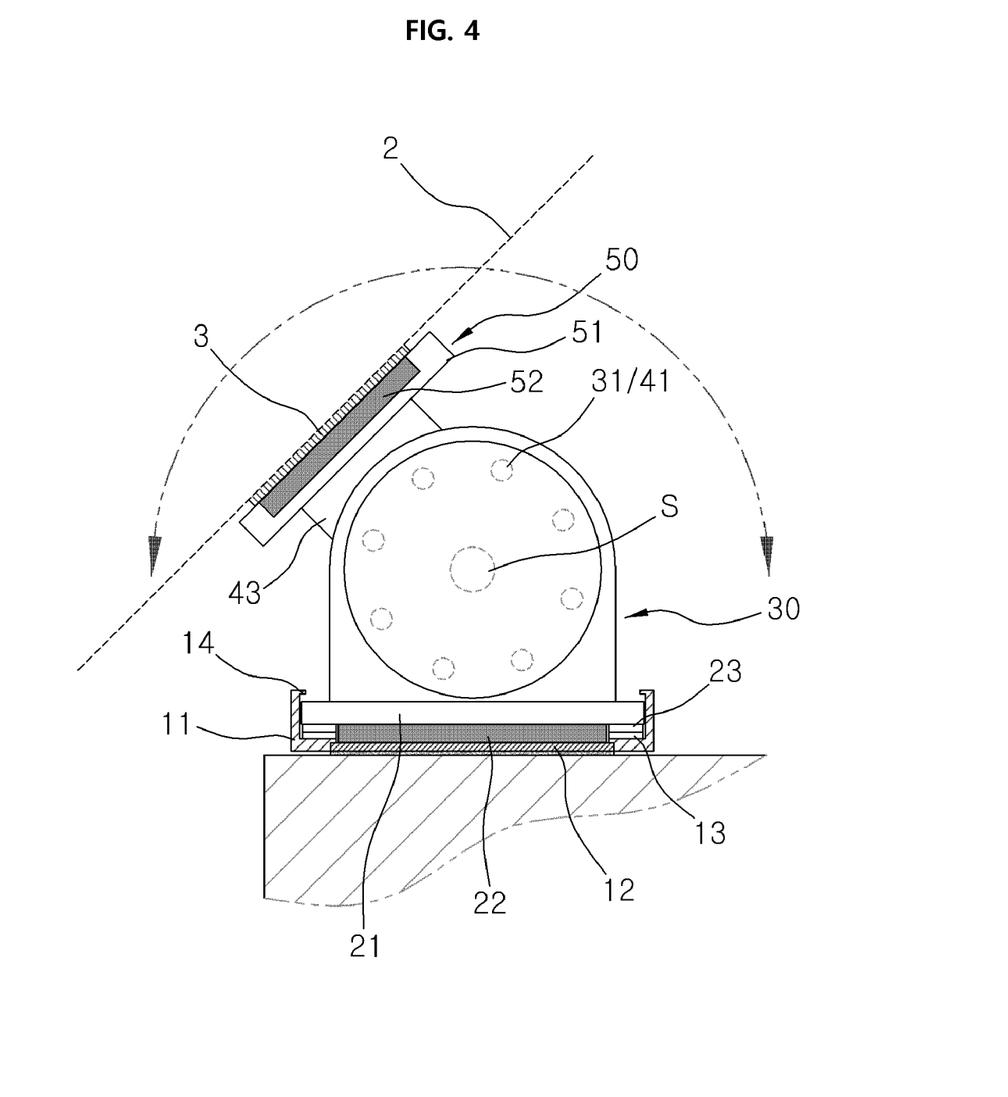
FIGS. 4 and 5 are views illustrating the rotating operations of vertical and horizontal rotation members.

As the first example, as shown in FIGS. 1 to 5, the support member 50 may include a magnetic substance 52. In this case, as shown in FIGS. 4 and 5, a terminal metallic plate 3 may be additionally attached to a rear surface of the portable terminal 2, such that the portable terminal 2 may be detachably attached simply and directly to a support plate 51 of the support member 50 through magnetic force between the terminal metallic plate 3 and the magnetic substance 52.

Figure 8:
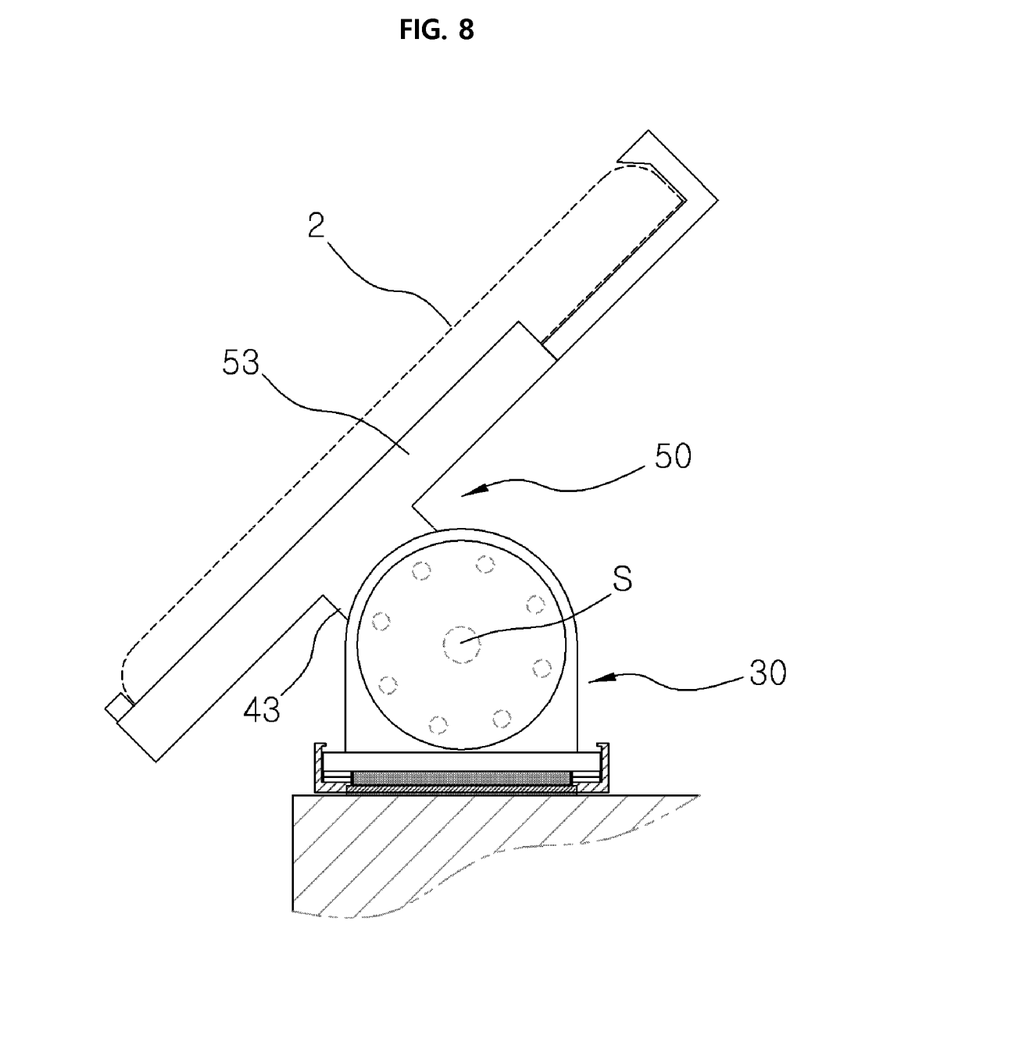
FIG. 8 is a view illustrating a device for supporting a portable terminal, to which a support member according to a second example is applied.

In addition, as the second example, as shown in FIG. 8, the support member 50 may include a support holder 53 such that the portable terminal 2 may be fittingly supported by elastically controlling a width of the support member 50. Although this case may be inconvenient as compared with that using magnetic force, there is no need to additionally attach any terminal metallic plates 3 to the portable terminal 2 and the portable terminal 2 is not influenced by magnetic force.

Figure 9:
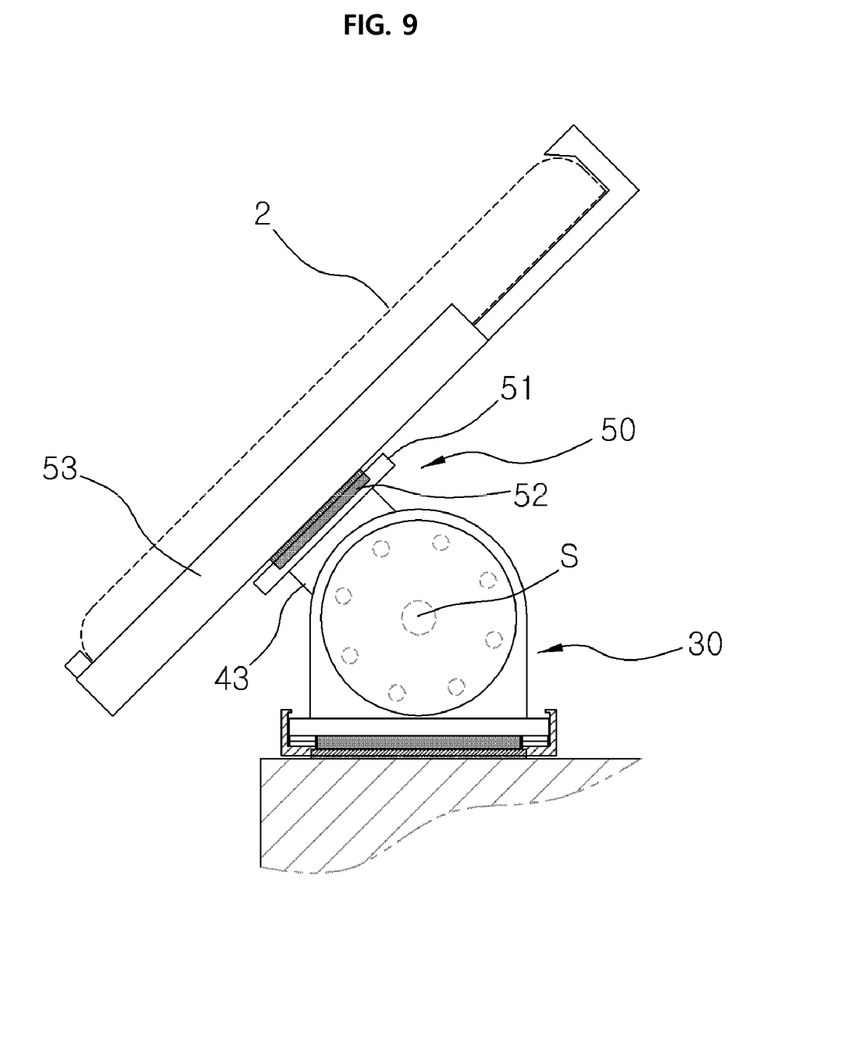
FIG. 9 is a view illustrating a device for supporting a portable terminal, to which a support member according to a third example is applied.

In addition, as the third example, as shown in FIG. 9, by combining the first and second examples, the support member 50 may include both the support plate 51 and the support holder 53. The magnetic substance 52 may be provided to the support plate 51 such that the support holder 53 may be detachably attached to the support plate 51 by magnetic force.

Figure 6:
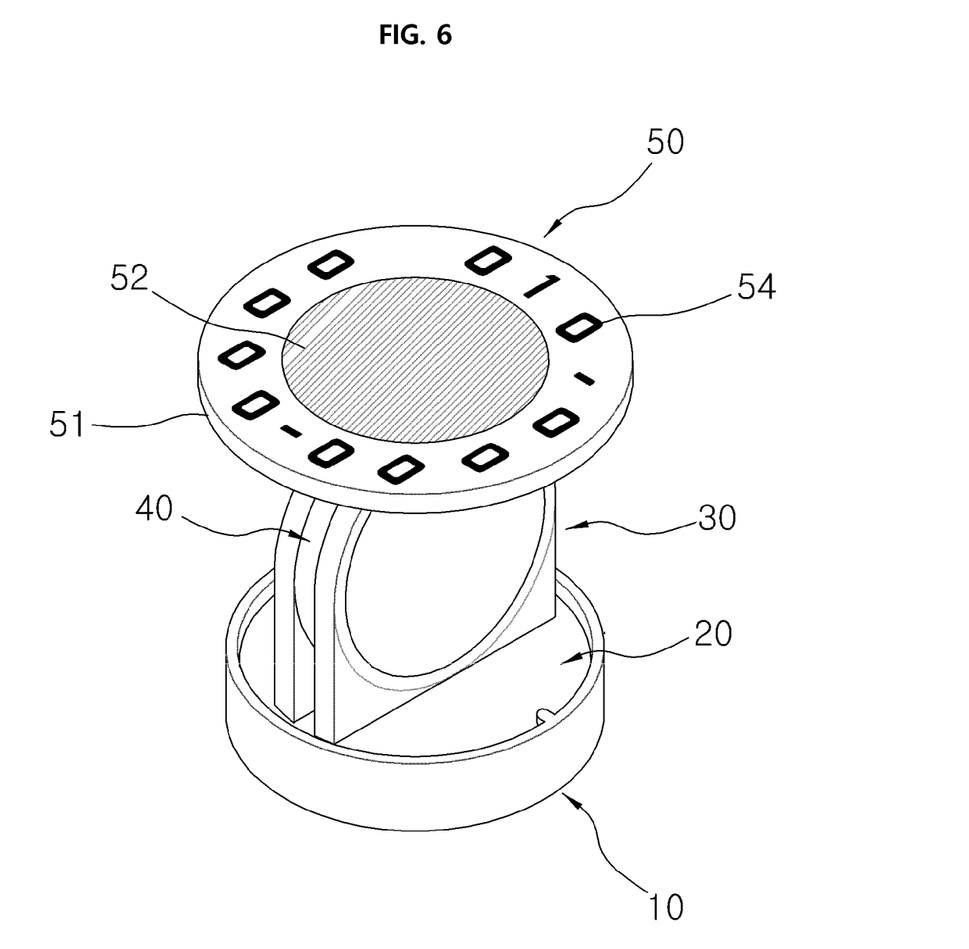
FIGS. 6 and 7 are views illustrating a device for supporting a portable terminal, which further includes a contact information display part.

Meanwhile, in the first and third examples, as shown in FIG. 6, when a vehicle is parked, a contact information display part 54 may be further formed on the support plate 51 along a circumference of the magnetic substance 52, such that the contact information display part 54 is utilized for displaying information about the contact of a vehicle driver.

Figure 7:
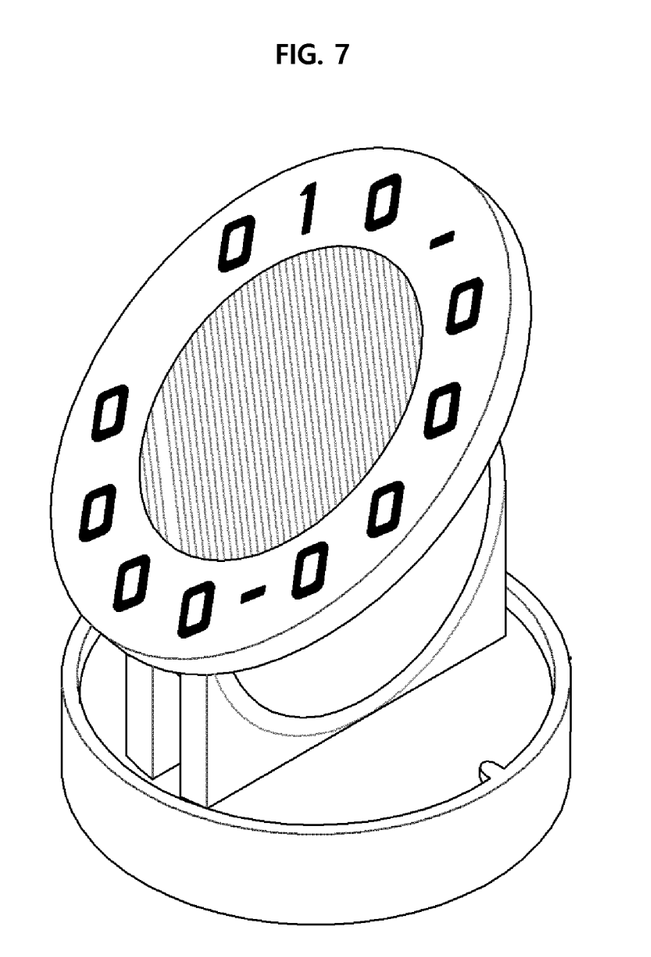

Thus, in case of the contact information display part 54, the device may be used as a device for supporting a portable terminal by attaching the portable terminal 2 to the support member 50 while a vehicle is driven. When the portable terminal 2 or the supporting holder 53 is separated from the support member 50 in parking the vehicle, the contact information display part is exposed, so that the device may be used as a contact information display device by rotating the support plate 51 such that the contact information display part 54 is viewed from an outside, as shown in FIG. 7.

The using of the device 1 for supporting a portable terminal configured as described above will be described below.

First, the base member 10 is fixedly attached onto the installing surface. The rotational body 21 is inserted into the base body 11 of the base member 10 to attach the magnetic substance 22 to the base plate 12, such that the horizontal rotation member 20 is coupled to the base member 10. In this case, after the position of the protrusion groove 24 is aligned with that of the latching protrusion 14, the rotational member is inserted.

Then, after the vertical rotation member 40 is rotated by a desired angle, when the portable terminal 2 is attached to the support member 50, the attachment of the portable terminal 2 is completed.

In the state that the portable terminal 2 is attached, by variously change the attachment state of the portable terminal at a desired angle in a desired direction through the combination of the horizontal rotation of the horizontal rotation member 20 and the vertical rotation of the vertical rotation member 40, so that the device may be conveniently used.

In addition, in the state that the portable terminal 2 is attached at a specific angle in a specific direction, the horizontal rotation member 20 is prevented from being horizontally rotated due to the force by the engagement between the concave-convex parts 13 and 23, and the vertical rotation member 40 is prevented from being vertically rotated due to the magnetic force interacting between the stopper magnets 31 and 41, so that the attachment state of the portable terminal 2 is stably maintained at a desired angle in a desired direction while the attachment angle and direction of the portable terminal 2 are not changed.

Specifically, when the portable terminal 2 is used as a navigator while being attached to a vehicle, even though the rotation force due to the vibration or left and right rotation of the vehicle is applied to the portable terminal 2 for a long time, the direction and angle of the attached portable terminal 2 are not changed but stably maintained, so that the portable terminal 2 is more conveniently useable.

Meanwhile, when a vehicle is parked in a state that the portable terminal 2 is attached to the vehicle, a use can take the portable terminal 2 by separating the portable terminal 2 from the support member 50. In this case, if the user needs to show the contact of the user to the others, the user rotates the support member 50 toward the front of the vehicle such that the contact information display part 54 may be viewed from the outside through the front glass, thereby utilizing the device to display contact information.

What is claimed is:

1. A device for supporting a portable terminal, the device comprising:
    a base member fixed to an installing surface;
    a horizontal rotation member coupled to the base member such that the horizontal rotation member is rotatable in a horizontal direction with respect to the installing surface, wherein a vertical support protrudes from a top surface of the horizontal rotation member;
    a vertical rotation member coupled to the vertical support such that the vertical rotation member is rotatable in a vertical direction with respect to the installing surface; and
    a support member-formed on one end of the vertical rotation member for attachment to the portable terminal,
    wherein the vertical support comprises a pair of left and right vertical supports spaced apart from each other by a predetermined interval, and the vertical rotation member is interposed between the pair of left and right vertical supports and rotatably shaft-coupled to the pair of left and right vertical supports, and a vertical rotation control unit is provided to the pair of left and right vertical supports and the vertical rotation member, which are coupled to each other, to selectively fix a rotation state of the vertical rotation member at various rotation angles;
    the vertical rotation control unit comprises a plurality of stopper magnets which are installed to the pair of left and right vertical supports and the vertical rotation member while being spaced part from each other by a predetermined angular interval on a concentric circle centered on the shaft; and
    each of the pair of left and right vertical supports is provided on an outer side surface thereof with a circular-shaped groove centered on the shaft, and the circular-shaped groove is fitted with a metallic finishing plate such that the metallic finishing plate is fixedly attached to the stopper magnets.

2. The device of claim 1, wherein the base member comprises a base body having an opened top surface and a cylindrical shape, and a metallic base plate fixed to an inner bottom of the base body, and the horizontal rotation member comprises a circular-shaped rotational body inserted into an inside of the base body, and a magnetic substance protruding from a lower surface of the rotational body and detachably attached to the base plate.

3. The device of claim 2, further comprising concave-convex parts formed on an inner circumference surface of the base body and a lower circumference surface of the rotational body, which face each other, wherein the concave-convex parts are engaged with each other.

4. The device of claim 3, wherein an upper end of the base body protrudes upward over the rotational body, which is inserted into the base body, by a predetermined height and a pair of latching protrusions are formed on both sides of the upper end of the base body, and a pair of protrusion grooves is formed at both sides on a lateral surface of the rotational body to prevent the pair of latching protrusions from interfering with the rotational body when the rotation body is inserted into or separated from the base body.

5. The device of claim 1, wherein the support member is provided with a magnetic substance for detachably attaching the portable terminal, and a contact information display part for displaying information about a user contact is formed around the magnetic substance.

6. A device for supporting a portable terminal, the device comprising:

a base member fixed to an installing surface, the base member comprising a base body having an opened top surface and a cylindrical shape, and a metallic base plate fixed to an inner bottom of the base body;

a horizontal rotation member coupled to the base member such that the horizontal rotation member is rotatable in a horizontal direction with respect to the installing surface, wherein a vertical support protrudes from a top surface of the horizontal rotation member, the horizontal rotation member comprising a circular-shaped rotational body inserted into an inside of the base body, and a magnetic substance protruding from a lower surface of the rotational body and detachably attached to the base plate;

a vertical rotation member coupled to the vertical support such that the vertical rotation member is rotatable in a vertical direction with respect to the installing surface;

a support member formed on one end of the vertical rotation member for attachment to the portable terminal; and concave-convex parts formed on an inner circumference surface of the base body and a lower circumference surface of the rotational body, which face each other, wherein the concave-convex parts are engaged with each other.

7. The device of claim 6, wherein an upper end of the base body protrudes upward over the rotational body, which is inserted into the base body, by a predetermined height and a pair of latching protrusions are formed on both sides of the upper end of the base body, and a pair of protrusion grooves is formed at both sides on a lateral surface of the rotational body to prevent the pair of latching protrusions from interfering with the rotational body when the rotation body is inserted into or separated from the base body.

* * * * *